(12) United States Patent
Kisovec et al.

(10) Patent No.: US 7,653,148 B2
(45) Date of Patent: Jan. 26, 2010

(54) SYSTEM AND METHOD FOR DELIVERY OF VIDEO, CONTENT ON DEMAND AND IP PACKETS

(75) Inventors: Jean-Francis Kisovec, Saint-Hubert (CA); Benoit Dufresne, Repentigny (CA)

(73) Assignee: Liquid Xstream Systems Inc., Montreal (CA)

( * ) Notice: Subject to any disclaimer, the term of this patent is extended or adjusted under 35 U.S.C. 154(b) by 0 days.

(21) Appl. No.: 12/360,973

(22) Filed: Jan. 28, 2009

(65) Prior Publication Data

US 2009/0135948 A1    May 28, 2009

Related U.S. Application Data

(62) Division of application No. 11/219,963, filed on Sep. 6, 2005.

(51) Int. Cl.
*H04L 27/36* (2006.01)

(52) U.S. Cl. .................. 375/298; 332/103; 332/106; 370/206; 375/141; 375/308; 375/343; 375/346; 375/295

(58) Field of Classification Search .................. 375/295, 375/298
See application file for complete search history.

(56) References Cited

U.S. PATENT DOCUMENTS

| | | | |
|---|---|---|---|
| 4,134,072 A | 1/1979 | Bolger | |
| 4,454,486 A | 6/1984 | Hassun et al. | |
| 5,329,260 A | 7/1994 | Poplin | |
| 5,412,352 A | 5/1995 | Graham | |
| 5,446,760 A | 8/1995 | Bienz et al. | |
| 5,732,106 A | 3/1998 | Rasmussen et al. | |
| 5,784,412 A | 7/1998 | Ichihara | |
| 5,937,011 A | 8/1999 | Carney et al. | |
| 5,966,055 A * | 10/1999 | Knoedl et al. | ................ 332/103 |
| 6,281,823 B1 | 8/2001 | Gross, Jr. et al. | |
| 6,518,802 B1 | 2/2003 | Tu et al. | |
| 6,693,970 B2 * | 2/2004 | Vankka | ........................ 375/261 |
| 7,019,599 B2 * | 3/2006 | Yoon | .......................... 332/106 |
| 7,110,445 B2 | 9/2006 | Melsa | |
| 7,142,613 B2 * | 11/2006 | Beaulieu | ..................... 375/295 |

(Continued)

OTHER PUBLICATIONS

Kamilo Feher; 1024-QAM and 256-QAM Coded Modems for Microwave and Cable System Applications, IEEE Journal on Selected Areas in Communications, vol. SAC-5. No. 3, Apr. 1987, pp. 357-368.

(Continued)

*Primary Examiner*—Shuwang Liu
*Assistant Examiner*—Dhaval Patel
(74) *Attorney, Agent, or Firm*—Goudreau Gage Dubuc

(57) ABSTRACT

A method and apparatus for modulating an input signal comprised of an ordered series of samples separated by a substantially constant period T comprising the steps of providing a carrier signal, the carrier signal comprised of a series of samples separated by a substantially constant period T, wherein one of the carrier samples corresponds to each of the input signal samples, selecting a plurality of N successive samples from the series of input signal samples, the series of samples having an input order, for each of the N selected samples in parallel, multiplying the selected sample by the corresponding carrier sample and recombining the N multiplied samples while maintaining the input order.

17 Claims, 9 Drawing Sheets

U.S. PATENT DOCUMENTS

| | | |
|---|---|---|
| 2004/0136471 A1* | 7/2004 | Pao et al. .................... 375/298 |
| 2004/0158867 A1 | 8/2004 | Mack et al. |
| 2006/0256881 A1 | 11/2006 | Yonge, III et al. |
| 2007/0050835 A1 | 3/2007 | Liva et al. |
| 2008/0107199 A1 | 5/2008 | Lakkis |

OTHER PUBLICATIONS

Stephan W. Mondwurf; Versatile Multistandard Digital TV Encoder Based on Programmable Hardware (CPLD), IEEE, 2000, 0-7803-5766-3/00.

Stephan W. Mondwurf; "Low Cost MPEG-2 Multiplexing Scheme for Multimedia and Digital TV Distribution Systems", Proceedings of the Fifth IEEE International Caracas Conference on Devices, Circuits and Systems, Dominican Republic, Nov. 3-5, 2004, pp. 236-239.

Loke Kun Tan, et al; "A 200 MHz Quadrature Digital Synthesizer/Mixer in 0.8 μm CMOS", IEEE Journal of Solid-State Circuits, vol. 30, No. 3, Mar. 1995, pp. 193-200.

Zhangwen Tang, et al; "High-Performance All-Digital Quadrature Frequency Synthesizer/Mixer", IEEE 2002, 0-7803-7523-08/02, pp. I-1-I-4.

Matthew L. Welborn; "Direct Waveform Synthesis for Software Radios", IEEE 1999, 0-7803-5668-3/99, pp. 211-215.

* cited by examiner

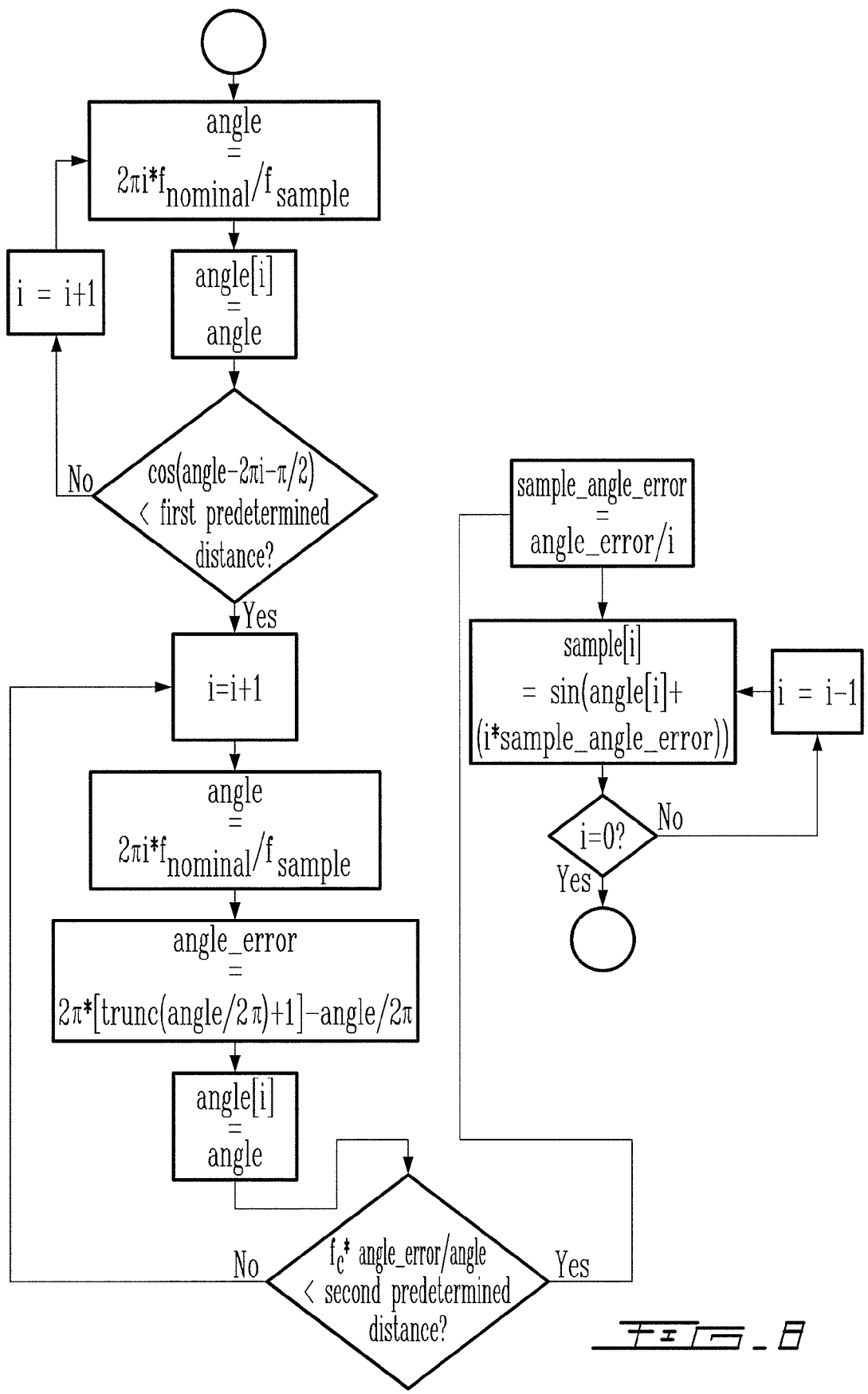
FIG_8

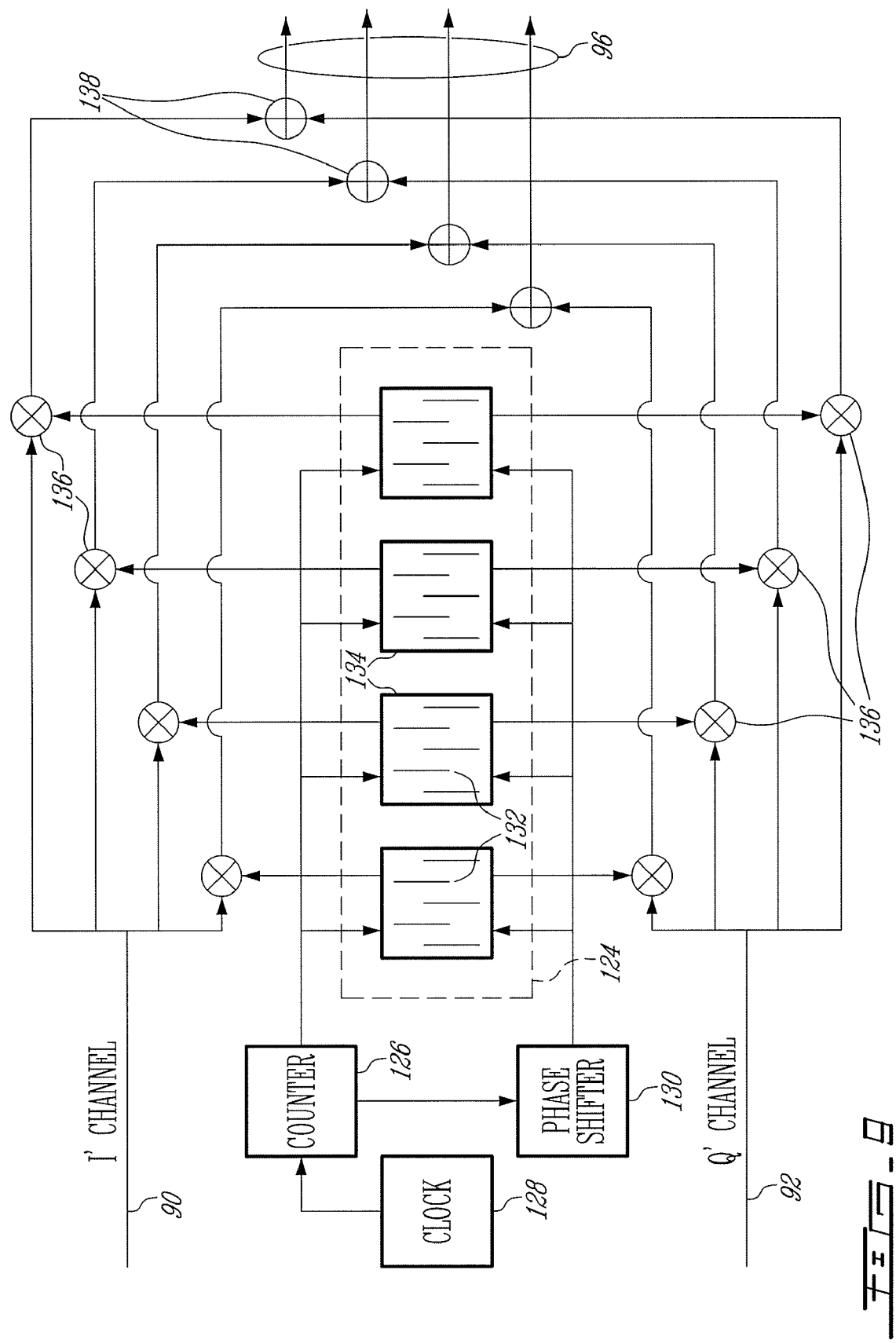

SYSTEM AND METHOD FOR DELIVERY OF VIDEO, CONTENT ON DEMAND AND IP PACKETS

FIELD OF THE INVENTION

The present invention relates to a system and method for delivery of video, content on demand and IP packets. In particular, the present invention relates to a system and method for providing high speed digital video and other services within a cable TV network.

BACKGROUND TO THE INVENTION

In order to deliver value added services such as video on demand and internet access as well as to provide more efficient use of the available RF spectrum, modern cable TV networks have moved from a primarily analog system to one which is largely digital, at least for large portions of the available RF spectrum. Of course, at the delivery end traditional cable TV networks are comprised of a distribution network based on 75 ohm coaxial cable. Such networks support a bandwidth of up to about 1 GHz. However, in order to take advantage of this bandwidth, both analog TV broadcasts and digital signals are modulated prior to transmission to particular predefined frequency bands, thereby ensuring that mutual interference is kept to a minimum.

The above prior art systems suffer from many drawbacks. For example, interconnections between sources of analog and digital signals are typically hardwired to the modulators meaning that reconfiguration is difficult, typically requiring a technician to manually reconfigure the system. For conventional broadcast TV this is generally not a problem as the channel line up is predefined. On the other hand, for Video on Demand (VOD) systems, where the stream of video data flows between the delivery system and set top box in a manner which is largely transparent to the user such hardwired systems are unable to allow for efficient use of the available bandwidth, in particular as the potential for switching video streams from one frequency band to another is limited if not impossible.

SUMMARY OF THE INVENTION

In order to overcome the above and other drawbacks, there is disclosed a method for shaping a series of pulses spaced in time for subsequent transmission in a communications system, each of the pulses having a magnitude. The method comprises the steps of providing a generic shaped pulse, for each pulse in the series, generating a shaped pulse by scaling the generic shaped pulse by an amount proportional to the magnitude, wherein at least a portion of each generated pulse overlaps in time with at least a portion of at least one subsequent generated pulse, and combining the overlapping portions of the generated pulses.

Additionally, there is provided a method for modulating an input signal comprised of an ordered series of samples separated by a substantially constant period T. The method comprises the steps of providing a carrier signal, the carrier signal comprised of a series of samples separated by a substantially constant period T, wherein one of the carrier samples corresponds to each of the input signal samples, selecting a plurality of N successive samples from the series of input signal samples, the series of samples having an input order, for each of the N selected samples in parallel, multiplying the selected sample by the corresponding carrier sample and recombining the N multiplied samples while maintaining the input order.

There is also disclosed a method for generating a digital representation of a sinusoidal carrier frequency for use in a communication system having a system sampling rate. The method comprises the steps of generating a series of samples by sampling the carrier frequency at the system sampling rate until a wrap up sample is yielded, the wrap up sample within a predetermined distance of an end of a cycle of the carrier frequency, adjusting a position of each of the series of samples by an amount proportional to the wrap up sample position from the cycle end and storing the adjusted samples in memory.

Additionally, there is disclosed a filter for shaping a series of pulses spaced in time for subsequent transmission in a communications system and having an impulse response, each of the pulses comprising a magnitude. The filter is comprised of a generic pulse stored in a memory, wherein the generic pulse comprises a shape substantially the same as the impulse response, a means for retrieving the generic pulse from the memory for each of the pulses, a multiplier for scaling the retrieved generic pulse according to the pulse magnitude wherein at least a portion of each scaled pulse overlaps in time with at least a portion of at least one subsequent scaled pulse and adder for combining the overlapping portions of the scaled pulses.

Furthermore, there is described an apparatus for modulating an input signal comprised of an ordered series of samples separated by a substantially constant period T. The apparatus comprises a numerically controlled oscillator comprising a carrier signal stored in memory as a series of samples separated by a substantially constant period T, wherein one of the carrier samples corresponds to each of the input signal samples, a demultiplexer for selecting a plurality of N successive samples from the series of input signal samples, the series of samples having an input order, a multiplier for multiplying each of the N selected samples by the corresponding carrier sample in parallel and a multiplexer for recombining the N multiplied samples while maintaining the input order.

BRIEF DESCRIPTION OF THE FIGURES

FIG. 8 provides a flow chart of a method to generate a digital representation of a carrier in accordance with an illustrative embodiment of the present invention; and FIG. 9 provides a schematic diagram of a modulator in accordance with an illustrative embodiment of the present invention.

DETAILED DESCRIPTION OF THE ILLUSTRATIVE EMBODIMENTS

Figure 1:
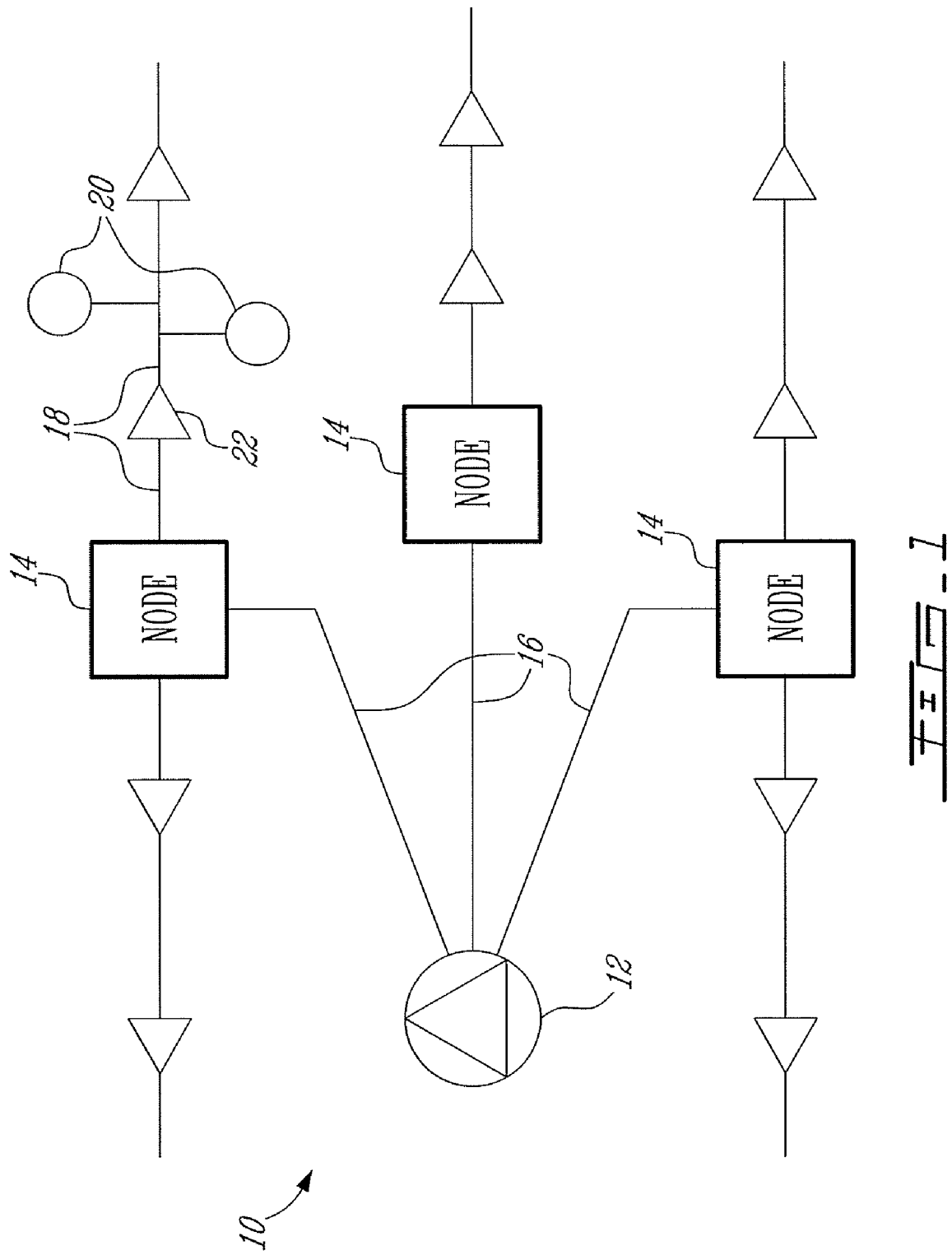
FIG. 1 provides a schematic diagram of a cable delivery network in accordance with an illustrative embodiment of the present invention.

Referring now to FIG. 1, an illustrative embodiment of a cable distribution network, generally referred to using the reference numeral 10, will now be described. The cable distribution network 10 is comprised of a head end 12 which delivers a variety of signals to one or more nodes as in 14 via one or more linear fibre optic links as in 16. Signals may comprise conventional RF television channels, digitised video programming and other data. As known in the art, linear fibre optic links as in 16 provide high band width and low noise over extended distances and are capable of transporting a full spectrum of cable television services over distances of up to about twenty (20) miles without amplification. Such links 16 includes transmitters (not shown) located at a head end which generate optical carriers which are intensity modulated using wideband RF spectra (note that other head end 12 to node 14 links, such microwave links, may also be used in particular applications). Using optical receivers (not shown), the nodes 14 extract the signals transmitted via the linear fibre optic links 16, provide conversion where necessary and otherwise prepare the received signals for transport via a distribution network comprised of coaxial cables as in 18 to one or more customers 20, typically comprised video and audio equipment located on the user's premises. As the coaxial distribution network may connect to many customers 20, repeaters as in 22 are provided for in order to re-amplify the analog signals and provide better signal quality at the customer 20.

Figure 2:
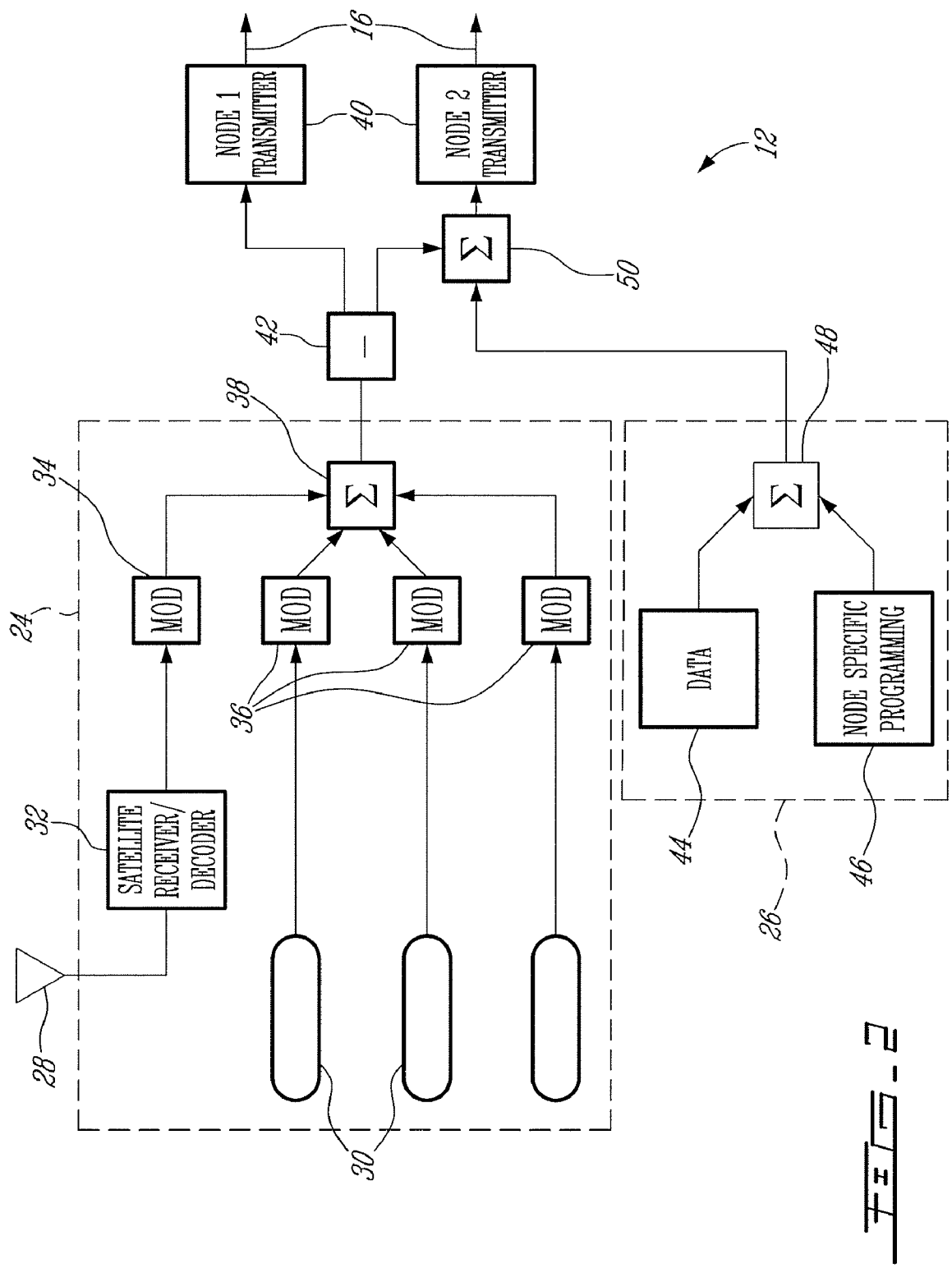
FIG. 2 provides a schematic diagram of a head end of a cable delivery network in accordance with an illustrative embodiment of the present invention.

Referring now to FIG. 2, a typical head end 12 will now be described. Note that the following description is primarily for illustrative purposes, and should not be construed as limiting. Modern head ends as in 12 typically comprise a broadcast component 24 transmitted to all nodes (reference 14 in FIG. 1) and a node specific component 26 for transmission to a particular node. For the broadcast component 24, the head end 12 typically receives signals from satellite earth stations 28 and other sources as in 30 (such as terrestrial antennas, microwave towers and other sources of broadcast programming). Signals received via the satellite earth stations 28 are decoded at the decoder 32 and modulated to predefined frequency band(s) using a modulator 34. Similarly, signals received from other sources as in 30 are modulated to predefined frequency band(s) using modulators as in 36. The modulated signals are combined using a combiner 38 and then relayed to the node transmitters as in 40 via a splitter 42. For the node specific component 26, data 44 (such as internet downloads) modulated onto a particular frequency band using 64-QAM or the like, node specific programming 46 and signals from other sources (such as telephony, not shown) are combined using a combiner 48 and then relayed to an additional combiner 50 where they are combined with signals from the broadcast component 24.

Node specific programming 46 may comprise such programming as near video on demand (NVOD), video on demand (VOD) and node specific broadcast programming. In particular, VOD may comprise a plurality of compressed video/audio streams in an MPEG-2 format. As known in the art, MPEG-2 provides for high quality video images with significant reductions in the amount of data required to render the video images. For example, as many as ten (10) high quality MPEG-2 video/audio streams can be transmitted within the 6 MHz channel currently occupied by a conventional analog video channel in the NTSC system.

As discussed above, the transmitters as in 40 generate optical carriers which are intensity modulated using the combined signals for transmission to their particular nodes via the linear fibre optic links as in 16.

Figure 3:
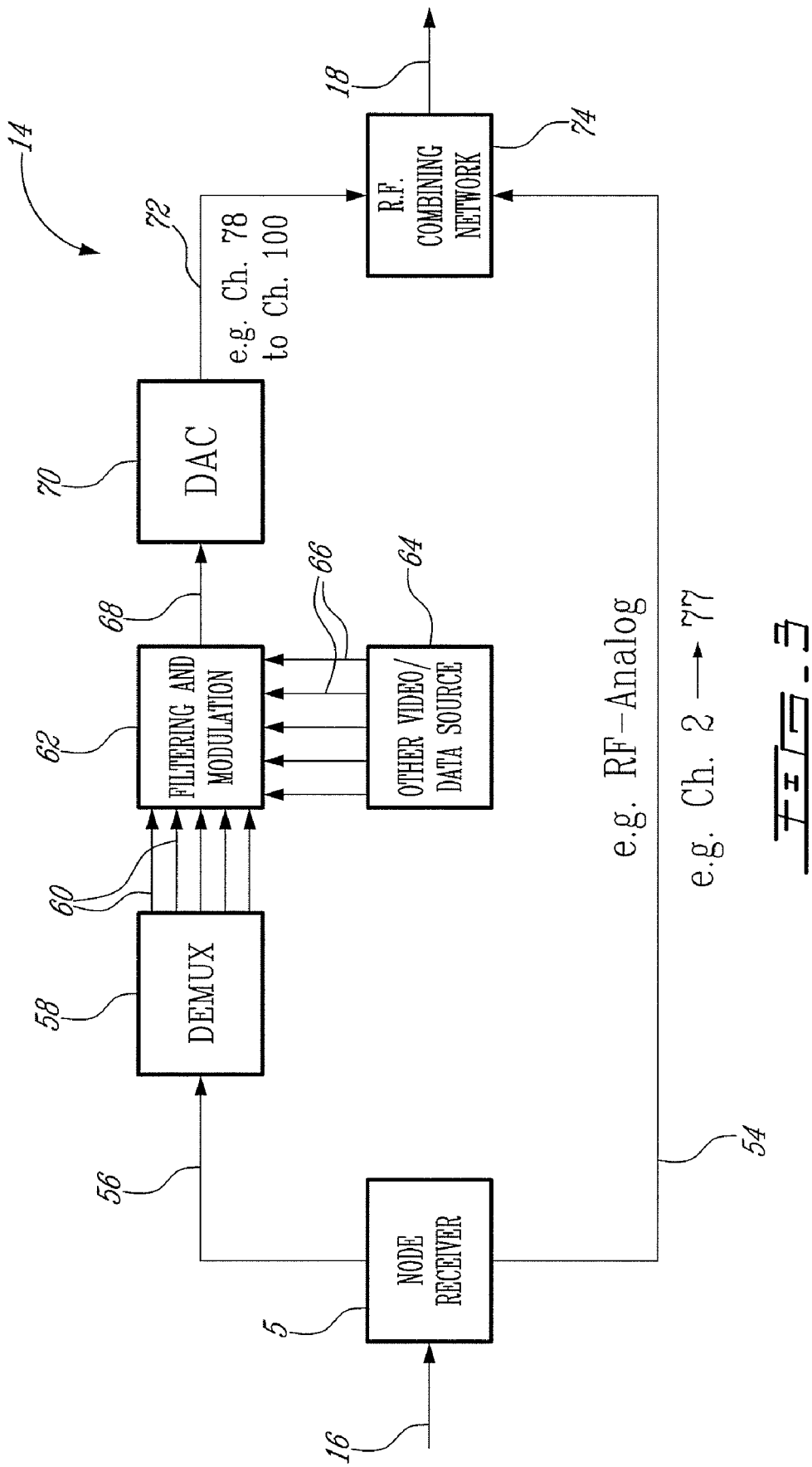
FIG. 3 provides a schematic diagram of a hub of a cable delivery network in accordance with an illustrative embodiment of the present invention.

Referring now to FIG. 3, signals transmitted via the linear fibre optic link 16 are received at the node 14 by a node receiver 52 and separated into one or more RF-analog streams as in 54 and one or more digital streams as in 56. As known in the art, the analog channels transmitted via the linear fibre optic link 16 can be direct converted into RF-analog channels using a suitable converter (not shown). Illustratively, the RF-analog channels are shown as comprising conventional channels 2 through 77 and illustratively provide the broadcast component of provided cable TV channels (although in particular case, one or more digital channels could also make the broadcast component). The digital stream(s) as in 56 are supplied as input to a de-multiplexer 58 which illustratively generates single MPEG-2 video/audio streams as in 60 from the digital stream 56. Additionally, other types of digital streams, such as control data from the head end, internet downloads, etc., could form one or more of the data streams as in 60. The MPEG-2 streams 60 are fed into a filtering and modulation module 62. In addition, other video/data sources as in 64, such as local VOD servers (not shown), may provide additional streams of data as in 66 for input into the filtering and modulation module 62.

The filtering and modulation module 62, as will be discussed in more detail below, combines and modulates the MPEG-2 streams 60 and the additional streams of data 66 to form a digital representation 68 of the analog output stream which is in turn fed into a high speed digital to analog converter (DAC) 70. As known in the art, the DAC 70 converts the digital representation 68 into an analog output stream 72. Illustratively, the analog output stream 72 occupies those bands which would otherwise be occupied by channels 78 through 158. The RF-analog stream 54 is combined with the analog output stream 72 using a RF combining network 74. The RF combining network 74 in turn relays the combined signals to the network of coaxial cables as in 18 for transport to the customers 20. As the bandwidth of the analog signals transmitted by the coaxial cables as in 18 is illustratively up to 1 GHz, it will be apparent to a person of ordinary skill in the art that in order to satisfy the Nyquist theorem, the sampling rate of the digital representation 68 of the analog output stream which is fed into the DAC 70 must be at least 2 GHz.

Note that, although the present illustrative embodiment discloses digitising only the 6 MHz channels 78 through 158, one or more of the 6 MHz channels 2 through 77 (illustratively occupied by RF analog transmissions) could also be digitised. Furthermore, it is not necessary that the digitised or analog channels be contiguous. Indeed, the channels of digital and analog transmissions can be intermingled using the present invention (for example, digital transmissions could be limited to channels having an odd number and analog transmissions to those channels having an even number). This greatly increases the versatility of the resultant system. Furthermore, although the selection of a 6 MHz channel has been carried out to conform to channel spacing as described for the NTSC system, the system as disclosed is readily capable of adapting to channels of different bandwidths and in other systems such as PAL, SECAM and the like.

Figure 4:
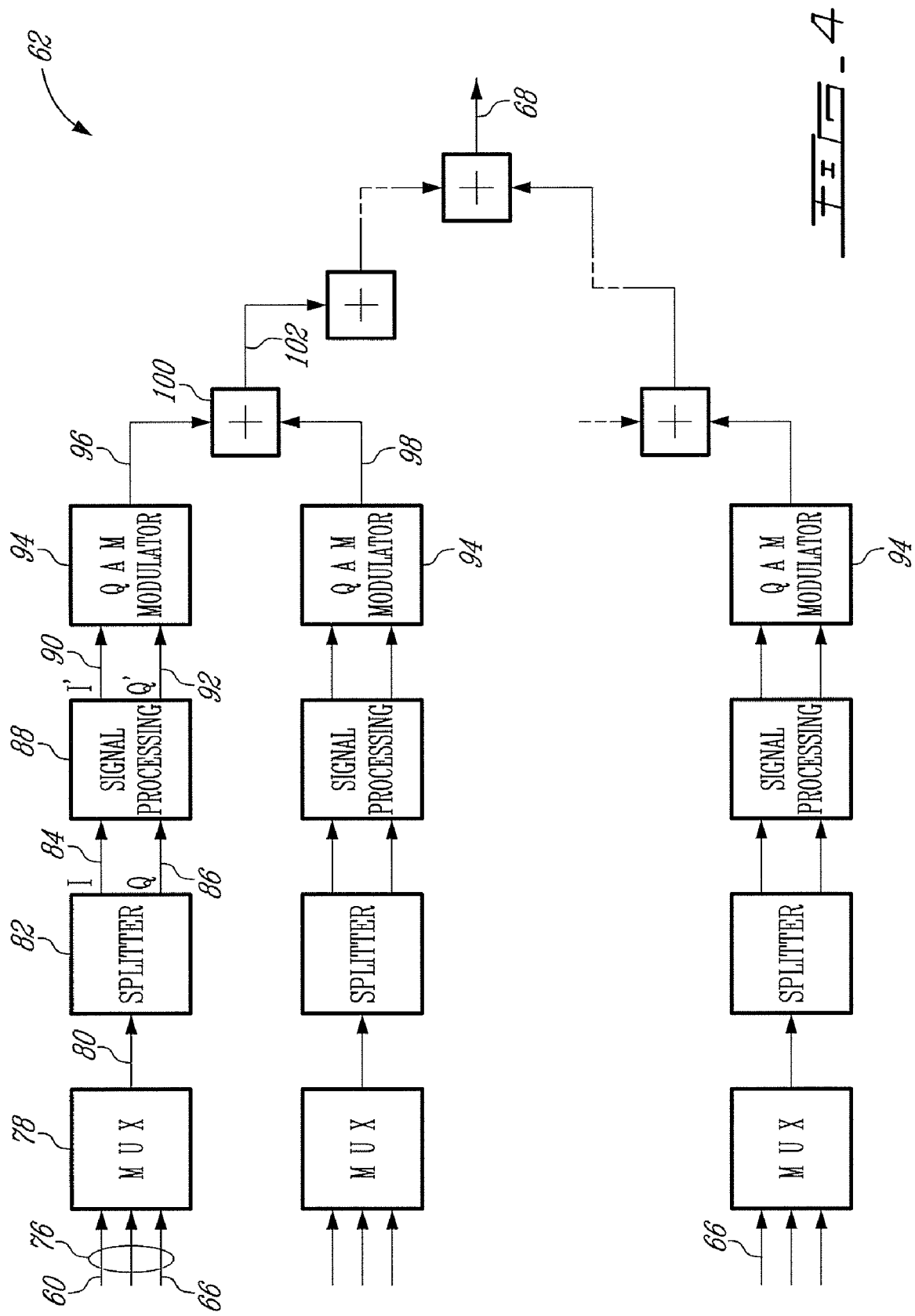
FIG. 4 provides a schematic diagram of a filtering and modulation module in accordance with an illustrative embodiment of the present invention.

Referring now to FIG. 4, in the filtering and modulation module 62, the individual MPEG-2 streams as in 60 or 66 are illustratively combined into groups of MPEG-2 streams as in 76. Each group of MPEG-2 streams 76 in turn serves as input to a multiplexer as in 78 which, using the group of MPEG-2 streams 76 forms an MPEG-2 transport stream 80. The number of MPEG-2 streams as in 60 or 66 which make up each group 76 are such that the resultant MPEG-2 transport stream 80 occupies a 6 MHz band, the typical bandwidth of analog channels in the FCC system. For example, 256 QAM running within a 6 MHz channel on a 75 ohm coaxial cable provides an information bit rate of approximately 38.8107 Mbps. Although the bit rate of MPEG-2 encoded video stream varies with the type of video being encoded as well as other factors such as resolution (for example, high-motion material such as sports may require twice the number of bits to achieve the same picture quality as other material), average bit rates for MPEG-2 encoded video streams are around 3 Mbps for transporting standard-definition movies having good picture quality. As a result, a 6 MHz channel may be used to transport 12 MPEG-2 encoded video streams. A person of skill in the art will understand, however, that a greater or smaller number of individual MPEG-2 streams as in 60 or 66 could be used to form a given MPEG-2 transport stream 80, with a corresponding change in the requisite bandwidth required to transmit the resultant transport stream. This could well be the case in a system which provides only digital transmission of video where a larger or smaller bandwidth may provide advantages. Note that, although the above has been described illustratively using MPEG-2 and MPEG-2 transport, a person of skill in the art will understand that other type of data streams, such as raw digitised video, video data in other formats, internet data, etc., may also be handled in a similar fashion. Additionally, different types of transports, for example such as those based on the OSI seven (7) layer reference model or the like, could also be used in a particular application.

Figure 5:
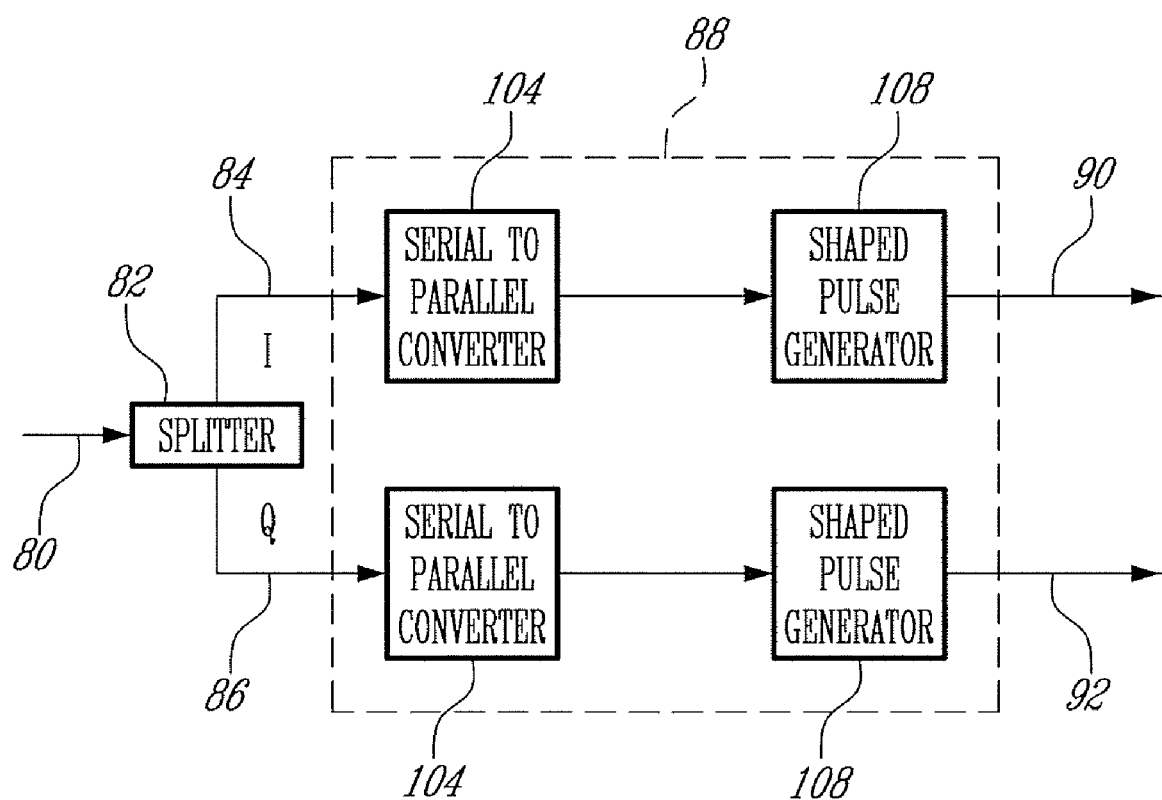
FIG. 5 provides a schematic diagram of a signal processing module in accordance with an illustrative embodiment of the present invention.

Referring to FIG. 5 in addition to FIG. 4, in order to modulate the data streams using QAM, the MPEG-2 transport stream 80 is provided as the digital stream which is input to a splitter 82. The splitter 82 divides the MPEG-2 transport stream 80 into an In Phase (I) channel 84 and a Quadrature (Q) channel 86, which is done by alternately directing successive bits or groups of bits via the I channel or the Q channel. As known in the art, QAM is used to transfer digital data by, on each of the I channel and Q channel, converting successive groupings of a predetermined number of bits into an amplitude which is used to modulate a carrier. Although of the same frequency, the carrier used to modulate the I channel is 90° out of phase with the carrier used to modulate the Q channel. The predetermined number of bits in each group is determined by the symbol size of the QAM being used. For example, 256 QAM has a symbol size of 8 bits and 1024 QAM has a symbol size of 10 bits. Therefore, if 1024 QAM is being used, on both the I channel and the Q channel, the value of each successive group of 5 bits is used to provide an amplitude to modulate the carrier.

Prior to modulating a carrier, however, the I channel 84 and the Q channel 86 both serve as inputs to a signal processing module 88 which, as will be discussed in greater detail below, converts each successive group of bits into a stream of pulses and introduces variations into the values of the pulses such that the chances of achieving a correct result on demodulation are improved. The filtered I channel 90 and the Q channel 92 both serve as inputs to a QAM modulator 94 which, as will be seen below, modulates the filtered I channel 90 and the filtered Q channel 92 using direct digital synthesis and combines these in the digital domain to form a synthesised QAM output 96. The synthesised QAM output 96 is combined digitally (as will be discussed in more detail below) with the synthesised QAM outputs as in 98 of other QAM modulators using a combiner as in 100 to form an output 102. The combined output 102 is in turn digitally combined with the combined output streams of other QAM modulators as in 94 which is in turn combined with other similarly formed output streams. The combining continues until all the synthesised QAM outputs as in 96 and 98 have been combined to form the digital representation 68 of the analog output stream.

As will be discussed in more detail below, the signal processing module 88 and the QAM modulators as in 94 operate entirely in the digital domain and at the same system frequency (illustratively 2 GHz although this could be lower or higher depending on the specific application, for example 4 GHz or 8 GHz). This means that all the elements of these modules can be driven with the same system clock, thereby greatly reducing or eliminating the effects of jitter. This provides distinct advantages over prior art systems where the signal processing modules and QAM modulators are typically driven at a variety of frequencies by a number of different clocks.

Additionally, the signal processing module 88 and the QAM modulators as in 94 are illustratively implemented using FPGAs. In order to allow the use of these relatively low cost/low speed devices, the inherent delay between successive symbols on both the I channel 84 and the Q channel 86 is taken advantage of. Indeed, as will be seen below, as the signal processing modules as in 88 and the QAM modulators as in 94 operate entirely in the digital domain and at the same system frequency, samples within a given symbol period T can be dealt with in parallel and at speeds well below the system frequency. This allows the implementation of a plurality of relatively low cost/low speed devices to carry out processing which would otherwise have to be carried out by a single device operating at or above the system frequency.

For example, in the illustrative embodiment, although the system frequency is 2 GHz, samples within a given period T can be illustratively divided into four (4) groups of samples (or channels) which are operated on independently by four (4) FPGAs, each having a bandwidth of 500 MHz. In this manner, although the individual devices are relatively slow, the 2 GHz bandwidth of the system can be maintained.

As known in the art in a conventional system using QAM modulation, after the digital data stream is split into the I and Q channels, a series of rectangular pulses are generated on each channel, the pulses having an amplitude which varies depending on the value of each successive group of bits. In systems using higher data rates, in order to improve the quality of the transmitted pulses by reducing noise which would otherwise be introduced through the instantaneous change in amplitude and phase of the modulated carrier, a pulse shaping filter is used.

As will be apparent to persons of skill in the art, the goal at the receiver of any data transmission system is to sample the received signal at an optimal point in the pulse interval to maximise the probability of an accurate decision as to the correct amplitude (and therefore the bits of the symbol being transmitted via that pulse). This requires that the shapes of the pulses be such that they do not interfere (or interfere only minimally) with one another at this optimal sampling point. In order to do this, the pulse shape must be such that it is zero at the optimal sampling point of all other pulses. Additionally, the pulse shape must be such that the amplitude decays rapidly outside the pulse interval. Although rectangular pulses meet these requirements, they are not the best choice for band-limited data transmission in that they have a significant energy over a fairly large bandwidth and in fact, as the spectrum of such a pulse is given by the sinc response, pulse bandwidth extends to infinity. Illustratively, one pulse shaping filter of particular interest, and one that is used extensively in data transmissions systems, is one which generates a raised cosine pulse from the input rectangular pulse.

In conventional systems, Finite Invariant Response (FIR) filters are typically used to implement a pulse filter (or any other type if filter, for that matter). However, in order to provide an output which can be used subsequently to form the digital representation of the analog output stream (68 in FIG. 4) which illustratively has a bandwidth of 1 GHz, a pulse shaping filter having a sampling rate of 2 GHz must be provided for. In order to take advantage of lower cost/lower speed technologies (such as FPGAs) which are unable to carry out the calculations necessary to generate such a pulse shaping filter at these very high sampling rates using conventional means (such as FIRs), an alternative approach is used.

The approach takes advantage of the associative property of convolution to pre-compute the result of each pulse and add the individual results together to form a final filtered signal. As is known in the art, if a pulse p is convoluted with and a filter h, the result is the coefficients of the filter multiplied by the amplitude of the pulse. As the pulses are equidistant and spaced according to the sampling rate, if a train of pulses is considered, the convolution of the pulse train with the filter is simply the addition in time of the individual results of each pulse with the filter:

$$(p_1+p_2+p_3+\ldots+p_n)\otimes h = p_1\otimes h + p_2\otimes h + p_3\otimes h + \ldots + p_n\otimes h \quad (1)$$

As discussed above, in a conventional system using QAM modulation, after the digital data stream is split into the I and Q channels, a series of rectangular pulses are generated on each channel, the pulses having an amplitude which varies depending on the value of each successive group of bits. The approach comprises pre-computing and placing in memory discrete versions (comprised of a number of elements, or samples, which make up the particular pulse shape) of the basic pulse shapes for all pulse amplitudes which would otherwise have been generated by passing the rectangular pulse through a pulse shaping filter. These basic pulse shapes can be subsequently accessed according to the amplitude (i.e. the value of each successive group of bits on either the I channel or the Q channel). The individual elements, or samples, of shaped pulses corresponding to a first group of bits are simply added to those corresponding to a second, third, fourth, etc., group of bits shifted in time according to the temporal spacing between successive groups of bits to form what would otherwise be the output of a shaped pulse filter.

Referring now to FIG. 5, successive groups of "N" bits being transmitted in series on the I channel 84 and the Q channel 86 serve as inputs to a pair of serial to parallel converters as in 104. The serial to parallel converters 104 convert each successive group of bits into a binary word having a width of N, where N is the same as half the symbol length of the order of QAM being used. For example, if 256 QAM is being used, N is equal to 4. These binary words are supplied as input to a shaped pulse generator 106 which selects a particular pulse stored in memory based on the value of the binary word.

As discussed above as infinite bandwidth cannot be sent in practice, the shaped pulse generators as in 106 limit the bandwidth of the pulses by shaping them with a filter, illustratively selected from the raised cosine family of filters. To determine the pulse duration, and subsequently the number of samples necessary to implement such a pulse shaping filter, the following formula can be used:

$$\text{pulse\_duration} = \text{round}(4/\text{roll\_off})*T \quad (2)$$

$$\text{samples} = \text{pulse\_duration} \times \text{sampling\_rate} \quad (3)$$

where T is the symbol period (period of the pulse stream) and roll_off is the roll-off factor of the filter. For 256 QAM, the roll-off factor is illustratively selected at 0.12 yielding pulse duration of 34 T. Note, however that a pulse having a duration of greater or less than 34 T, for example 12 T or 48 T, depending on the resolution needed to support a particular standard or specification.

Continuing with the example, in the event that 256 QAM is being used for transmission via a 6 MHz channel, pulse amplitudes are being supplied to the shaped pulse generators as in 106 at a symbol rate of about 5.360537 MHz. As such, the symbol period T is about $1.865 \times 10^{-5}$ seconds. Given the sampling rate of 2 GHz, and given that each shaped pulse in the above example has a nominal duration of 34 T, each digital representation of a shaped pulse comprises about 12,700 samples. These are represented by binary words having a varying width between 8 bits and 16 bits. As will be understood by a person of ordinary skill in the art, only the samples within T of the centre of the shaped pulse need to be represented with 16 bits. The other samples of the shaped pulse decay rapidly, and for the tails located at beginning and end of the pulse, only 8 bits are necessary to adequately represent the values. A typical allocation of bits for a pulse of duration 34 T is as follows:

Periods [33] and [0]: 8 bits

Periods [32] and [1]: 8 bits

Periods [31] and [2]: 8 bits

Periods [30] and [3]: 9 bits

Periods [29] and [4]: 9 bits

Periods [28] and [5]: 9 bits

Periods [27] and [6]: 9 bits

Periods [26] and [7]: 9 bits

Periods [25] and [8]: 10 bits

Periods [24] and [9]: 11 bits

Periods [23] and [10]: 11 bits

Periods [22] and [11]: 12 bits

Periods [21] and [12]: 12 bits

Periods [20] and [13]: 13 bits

Periods [19] and [14]: 13 bits

Periods [18] and [15]: 14 bits

Periods [17] and [16]: 16 bits

As each period T is illustratively comprised of about 374 samples and about 17 kbytes of memory is necessary to store a representation of a shaped pulse. However, note that the above bit allocation is purely illustrative, and other allocations are also possible, with corresponding increases in the amount of memory necessary to store the shaped pulse. For example, all the samples used to describe the pulse could be represented by 16 bit words.

Still referring now to FIG. 5, using 256 QAM, the magnitude of each rectangular pulse (or symbol) on the I and Q channels is described using a 5 bit binary word (one bit is the sign bit) available at the output of the serial to parallel converters as in 104. As a result, a shaped pulse may have one of 16 different amplitudes, with each of the amplitudes being illustratively equidistant in steps of $2/15$ of the maximum peak-to-peak DAC voltage. However only one such pulse need be stored as samples in memory as the other magnitudes can be generated simply by scaling the magnitude of each of the samples describing the pulse using the value of the 5 bit binary word.

Figure 6:
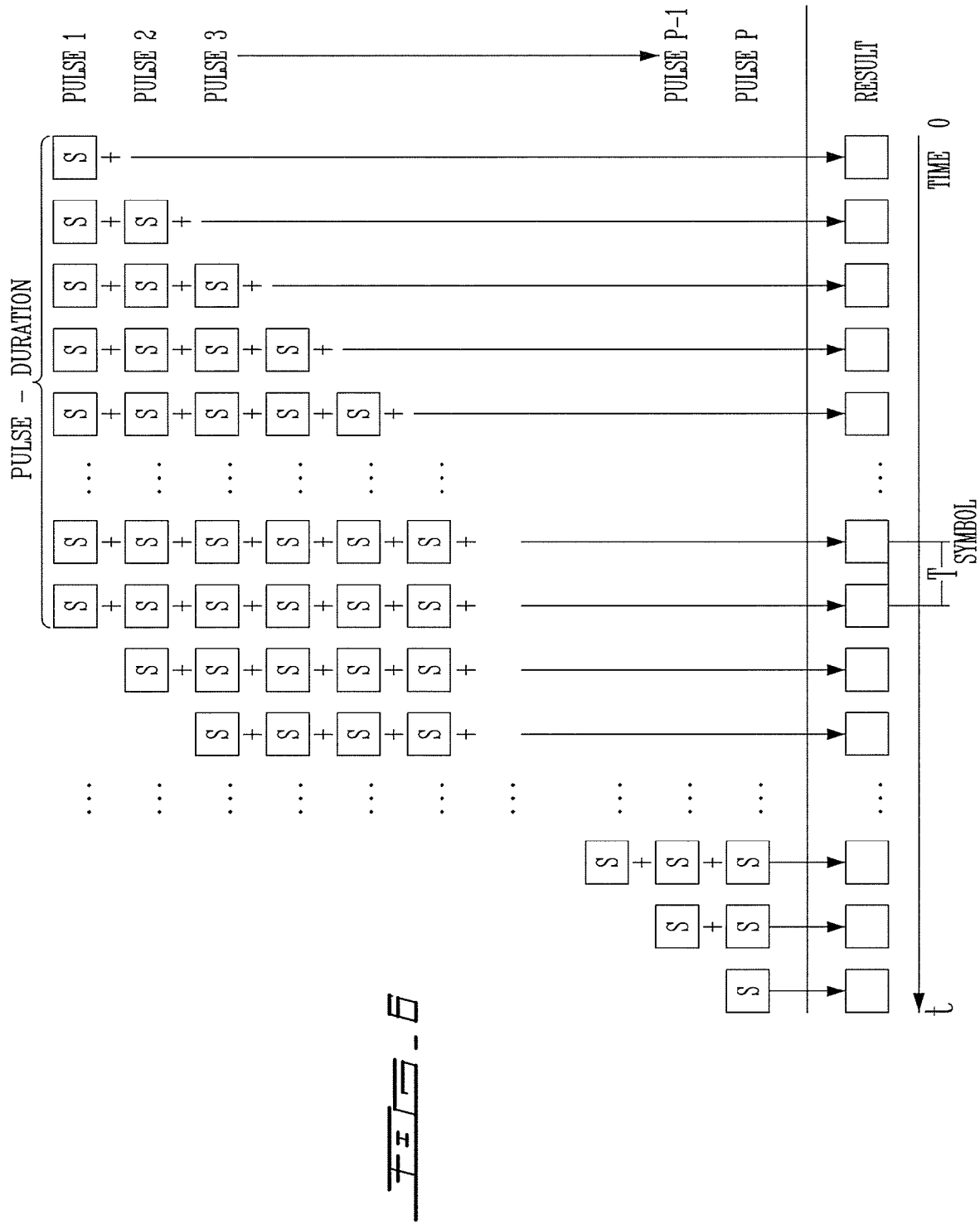
FIG. 6 provides a diagram of how overlapping samples of generated shaped pulses are added together to form a resulting pulse stream in accordance with an illustrative embodiment of the present invention.

It will be apparent to a person of skill in the art that, given that the samples required to represent a given shaped pulse span a period of time which is greater than the temporal distance between the zero crossings of two (or more) successive rectangular pulses, a portion of samples of a given shaped pulse will temporally overlap with a portion of the samples of other shaped pulses to which it is sufficiently proximate in time. As a result, in order to provide a sampled output representing a series of successive shaped pulses, the overlapping samples of successive shaped pulses representing successive symbols must be added to one another. This is illustrated in FIG. 6 where the groups of samples S of shaped pulses Pulse 1 through Pulse P, each pulse of a duration pulse_duration*$T_{symbol}$ where $T_{symbol}$ is the period between successive symbols, are sequentially added together to form a resultant output stream RESULT. Of course, a person of skill in the art will understand that this addition process can be streamlined in that it is only necessary to add samples representing successive shaped pulses to the results of the previous additions of the samples of previous pulses. Additionally, as shaped pulse vary from one another only in terms of magnitude, samples representing a particular shaped pulse can be generated simply by scaling the unitary samples by the magnitude in question.

Figure 7:
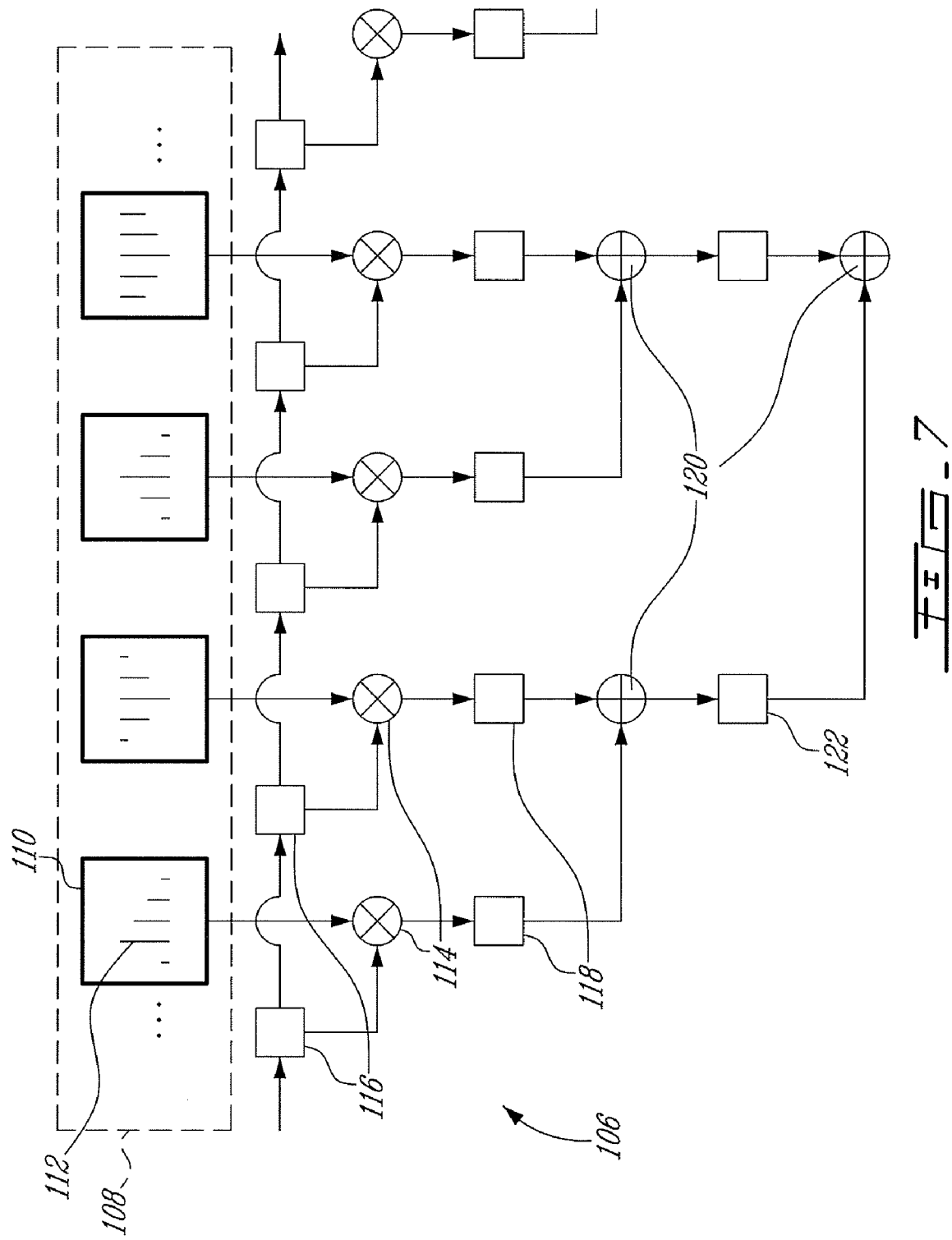
FIG. 7 provides a schematic diagram of a shaped pulse generator in accordance with an illustrative embodiment of the present invention.

Referring now to FIG. 7, illustratively, in order to add the samples of successive pulses of a particular time period, the architecture of the shaped pulse generator 106 is comprised of a memory bank 108 containing the samples representing a shaped pulse having a unitary magnitude. The memory bank 108 is divided into a series of sub memories 110 (illustratively 34 in the case of a filter having a 0.12 roll-off) each containing the ordered samples 112 of a portion of the shaped pulse having a length equal to the period T of the rectangular pulse train supplied to the serial to parallel converter (reference 104 on FIG. 5). A series of multipliers 114 are used to scale the samples 112 of a particular sub memory as in 110 using a magnitude value as in 116 and are used to generate scaled samples as in 118. The magnitude values 116 are illustratively held in a chain of interconnected registers or the like. Similarly, the scaled samples as in 118 are temporarily stored in a series of registers or the like. Scaled samples as in 118 from successive shaped pulses are added together using adders as in 120 to form combined values as in 122 which are in turn added together using additional adders as in 120 arranged as an adding tree. For each successive period of time equal to the symbol period T, the magnitude values 116 are shuffled to a subsequent register and the process repeated. In this way, an output stream of samples is generated comprising the combined samples of a series of overlapping shaped pulses. The output of each shaped pulse generator 106 are blocks of M samples, illustratively each of 16 bits, where M is the number of samples in each period T. As will be apparent to a person of ordinary skill in the art, the blocks are output at a rate equal to the symbol rate.

Still referring to FIG. 7, a person of skill in the art will understand that it is only necessary to add a given sample 112 in each sub memory 110 to a corresponding sample 112 in each of the other sub memories 110, where each of the samples has been scaled accordingly using the magnitude values as in 116. These samples, of course, are each separated by the interval T, where T is the period of the rectangular pulse train supplied to the serial to parallel converter (reference 104 on FIG. 5). Additionally, by taking advantage of parallel processing techniques, the rate at which the various components must operate can be lowered well below the system frequency, illustratively 2 GHz, thereby allowing the use of slower speed devices which would otherwise be unable to operate at the system frequency. Illustratively, the shaped pulse generator 106 operates using four parallel channels (although a lower or higher number of channels could be used in a given implementation).

Although the samples 112 as described above are divided into memory blocks 110, in practice the samples 112 are arranged into groups of samples which are to be added together once scaled with their corresponding magnitude values as in 116. This improves performance by providing the processor(s) (not shown) with all samples necessary to carry out a particular operation while reducing the number of clock cycles which would otherwise be consumed in retrieving individual samples from memory. Continuing with the example as described hereinabove, each shaped pulse has a duration of 34 T. As a result, for each output value 34 scaled samples must be added together. As described above, these samples have different lengths depending on which portion of the pulse they are describing. As a result, a word can be formed comprised of a sample from period 33 (8 bits), period 32 (8 bits), period 31 (8 bits), period 30 (9 bits), etc., through period 17 (16 bits) to period 0 (8 bits). This word has a length of 362 bits. In order to better support the processing of four channels in parallel, this word is concatenated together with three (3) other words (typically representing adjacent samples) to form a block of samples having a width of 1448 bits, which are then stored in memory.

Continuing with the example using 256 QAM for transmission via a 6 MHz channel and a 2 GHz sampling rate as described above, M is illustratively 374 and the symbol rate 5.360537 MHz.

Of note is that the shaped pulses used on both the I and Q channel are illustratively the same, and as a result (for example, by using a dual ported memory) the same memory banks 108 and stored samples 112 can be shared between both the shaped pulse generator 106 operating on the I channel and the shaped pulse channel operating on the Q channel. Additionally, as the shaped pulse is the same for all channels, the same memory banks 108 and stored samples 112 can be shared between shaped pulse generators as in 106 operating on different input symbol streams.

Referring back to FIGS. 4 and 5, the blocks of samples generated as output of the shaped pulse generators as in 106 is subsequently fed into the QAM modulator module 94 for modulation onto a given transmission channel, illustratively as described above one of channels 78 through 100 in a system according to FCC TV transmission standards. Referring now to FIG. 8 in addition to FIG. 5, as the output of the shaped pulse generator as in 106 are blocks of samples, and therefore in the digital domain, and the sampling rate meets the Nyquist rate of the band in question (in the case at hand, 2 GHz), processing of the QAM can be continued in the digital domain using Direct Digital Synthesis (DDS).

Note that, and as will be discussed below, in order to take advantage of parallel processing techniques, groups of samples (illustratively 4 samples per group) are relayed to the QAM modulator module 94 on both the filtered I channel 90 and the filtered Q channel 92 in parallel.

As known in the art, DDS allows for the generation of RF frequency signals by synthesising the output waveform using digital techniques. Using DDS, the points of the carrier waveform are stored in a digital format and then recalled as necessary for combination with the signals to be modulated by the carrier. The resultant digital signals are then supplied as input to a DAC for formation of the final analog output. As discussed above, in a conventional QAM system, the output of the pulse shaping filter is modulated by multiplying the shaped pulse on the I channel by a carrier frequency $f_c$ where $f_c$ is centred in the frequency band of the FCC channel which is being used to transmit the modulated signals. Similarly, shaped pulse on the Q channel is modulated by the same carrier frequency $f_c$ shifted in phase by 90°.

As discussed above, any signal can be reconstructed if the sampling frequency is at least twice the signal's frequency. However, in many cases the carrier does not have to be precise so there is some degree of play vis-à-vis the temporal spacing between the samples used to describe the carrier (for example, provided the frequency of a resultant carrier is within jitter tolerance). As a result, the spacing between the samples can be adjusted (and thus the carrier frequency) such that a zero crossing occurs within a reasonable number of cycles (and therefore samples). In this regard, too few samples leads to an imprecise description of the carrier, and too many leads to redundancy and will unnecessarily consume memory. A zero crossing is some multiple N of the carrier which when divided by the sampling rate yields an integer. The following formula can be used to determine the adjusted carrier $f_c$ for a given number of samples N, nominal carrier frequency $f_{nominal}$ and sampling rate $f_{sample}$.

$$f_c = \text{Round}\left[\frac{N \cdot f_{nominal}}{f_{sample}}\right] \cdot \frac{f_{sample}}{N} \qquad (4)$$

It will be apparent now to a person of skill in the art that in most cases the optimal number of samples N will have to be determined and the samples individually calculated for each nominal carrier frequency. Typically, the number of samples N is calculated by sampling the nominal carrier at the sampling rate until a sample is reached whose value is within a predetermined range. One method comprises sampling the nominal carrier at the sampling rate beginning at 0 until an intermediate sample is reached whose value is within a first predetermined distance of a peak of a cycle of the nominal carrier ($\pm\pi/2$) and then continuing until a wrap up sample is reached whose value is within a second predetermined distance of the end of a cycle, or zero crossing, of the carrier ($2\pi$). The first predetermined distance is less than the specified tolerated I/Q phase offset, typically measured in degrees. As the carrier is a sinusoid, the first and second predetermined distances are typically expressed as angular displacements which, using the frequency of the carrier in question, readily translate into a predetermined number of cycles per second, or Hertz.

The tolerances of the communications system are specified by the communications system providers who in turn conform to a variety of industry and international standards, an example of which is ITU-T Recommendation J.83 Series J: Transmission of Television, Sound Programme and Other Multimedia Signals, the entire content of which is incorporated herein by reference.

Referring now to FIG. 8, a flow chart of an illustrative embodiment of the method described hereinabove is provided.

For example, for channel 90 the visual carrier frequency in a cable TV network is 619.25 MHz. As the visual carrier is 1.25 MHz above the lower edge of the band and 4.25 MHz below the upper edge of the band, the nominal carrier frequency $f_{nominal}$ is 621 MHz. At a sampling rate ($f_{sample}$) of 2.015561912 GHz and a first predetermined distance of less than one (1) degree and subsequently using a second predetermined distance of less than 22 kHz to determine the wrap up sample, it can be shown that the wrap up sample (i.e. the first sample which is within this range of the zero crossing) is the sample with the index 370, which is within about 16.8 kHz of the zero crossing. As a result, N=370 is sufficient to adequately express a nominal carrier having a frequency of 621 MHz (which yields an adjusted carrier of $f_c$=621.0168 MHz, which is within the jitter tolerance for a cable TV network). Note that although the present illustrative embodiment has used a second predetermined distance of less then 22 kHz in a given embodiment the second predetermined distance could be less than 22 kHz or greater than 22 kHz.

Referring now to FIG. 9, the QAM modulator 94 is comprised of a pair of numerically controlled oscillators (NCOs), each comprised of a look up table 124 in which a digitised version of one cycle of the adjusted carrier $f_c$ is stored (typically implemented as a read only memory, or ROM). The NCOs can be implemented independently. Alternatively, however, and as illustrated in FIG. 8, the first NCO generates the cosine carrier frequency and comprises a counter as in 126 for addressing the look up table 124 and a clock 128 to drive the counter at the system frequency while the second NCO comprises a phase shifter 130 which generates the sine carrier frequency by shifting the output of the counter 126 (for example by adding a predetermined amount to the output of the counter 126) such that the sample at the address the phase shifter designates is always 90° out of phase with that designated by the counter 126.

Successive address locations in the look up table 124 contain successive samples 132 of the given carrier frequency $f_c$. Note that the samples as in 132 can be arranged within the look up table 124 such that simply by incrementing the counter 126 the requisite sample can be addressed. Alternatively, the counter 126 could jump a predetermined number of steps to the next sample.

As the counter 126 is incremented, the counter 126 addresses the next memory location in the look up table 124 thereby providing a sequential stream of samples representing the adjusted carrier. Conventionally, the rate at which the binary counter 126 is clocked is the system sampling rate, which in the case at hand would illustratively be 2 GHz. However, as will be seen below, the samples are generated by the shaped pulse generator (reference 106 in FIG. 5) in blocks and as a result, by arranging the look up table 124 into a series of memory banks as in 134, parallel processing techniques can be taken advantage of to reduce this rate. Additionally, similar to the architecture of the shaped pulse generator (reference 106 in FIG. 5) as described hereinabove, as the same set of samples may be used to generate the carrier for both the In phase and Quadrature channels, the memory banks as in 134 can be dual ported.

Still referring to FIG. 9, for each increment of counter 126, one group of (illustratively 4) samples are received on the filtered I channel 90 and the filtered Q channel 92. These samples are supplied individually to one of a plurality of multipliers as in 136 together with the sample of the carrier frequency retrieved from one of the banks 134 in the look up table 124 using the address provided (in the case of the I channel 90) by the counter 126 or (in the case of the Q channel 92) the phase shifter 130. Subsequently, the result of the multipliers as in 136 for the I channel are added to those of the Q channel via a series of adders as in 138 to form the synthesised QAM output 96.

Referring back to FIG. 4, as discussed above, the synthesised QAM output 96 is combined digitally with the synthesised QAM outputs as in 98 of other QAM modulators using an adder as in 100 to form an output 102. Of note is that, as the synthesised QAM output comprises groups of (illustratively) four (4) samples in parallel, and as all QAM modulators as in 94 operate using the same sampling rates and similar architecture, the adder as in 100 also adds groups of samples from a first QAM modulator to groups of samples from a second QAM modulator in parallel. The combined output 102 of the adder 100 is in turn digitally combined in the same fashion with the combined output streams of other QAM modulators as in 94 which is in turn combined with other similarly formed output streams. The combining continues until all the synthesised QAM outputs as in 96 and 98 have been combined to form the digital representation 68 of the analog output stream. This digital representation is comprised of groups of (illustratively) four (4) successive samples which are, referring back to FIG. 3, supplied to the DAC for conversion into the analog output stream 72.

In order to improve performance of the above system, peak power on the channel can be distributed by slightly delaying the output of the synthesised QAM output of a first QAM modulator versus the outputs of other QAM modulators (this can also be done in the shaped pulse generator).

Referring back to FIG. 3, the analog output stream 72 is combined with the one or more RF analog stream 54 (illustratively channels 2 through 77) using, for example, a conventional RF combining network 74. The output of the RF combining network 74 is then distributed via a coaxial cable to the customers (reference 20 in FIG. 1).

Although the present illustrative embodiment discloses the application of the pulse shaping, modulation and parallel processing techniques in the context of a cable TV system, the same pulse shaping, modulation and parallel processing techniques could also be used in other communications systems, for example wireless communications systems or the like.

Although the present invention has been described hereinabove by way of illustrative embodiments thereof, these embodiments can be modified at will without departing from the spirit and nature of the subject invention.

What is claimed is:

1. A method for modulating first input signal and a second input signal, each of said first and second input signals comprised of an ordered series of samples separated by a substantially constant period T, the method comprising:

providing a first carrier signal, said first carrier signal comprised of a first ordered series of first carrier samples separated by the substantially constant period T, wherein one of said first series of carrier samples corresponds to each of the first input signal samples;

providing a second carrier signal, said second carrier signal comprised of a second ordered series of carrier samples separated by the substantially constant period T, wherein one of said second series of carrier samples corresponds to each of the second input signal samples;

providing a Digital to Analog Converter (DAC);

selecting a plurality of groups of N successive first samples from said first series of input signal samples, said first series of samples having an input order;

for each group of first samples in parallel, multiplying each of said N first samples by said corresponding first carrier sample;

recombining said groups of N multiplied first samples while maintaining said input order to form a first series of output samples;

selecting a plurality of groups of N successive second samples from said second series of input signal samples, said second series of samples having an input order;

for each group of N second samples in parallel, multiplying each of said N second samples by said corresponding second carrier sample;

recombining said groups of N multiplied second samples while maintaining said input order to form a second series of output samples;

adding each of said first series of output samples to a respective one of said second series of output samples to form a combined series of output samples; and converting said combined series of output samples to an analog signal using said DAC.

2. The method of claim 1, wherein the modulation method is a QAM modulation method, the first input signal is representative of the I-channel, the second input signal is representative of the Q-channel, said first and second carrier signals are sinusoids having a cycle with a duration of greater than or equal to 2 T and further wherein said first carrier signal and said second carrier signal are 90 degrees out of phase.

3. The method of claim 1, wherein ½ T=2 GHz.

4. The method of claim 1, wherein N=4.

5. The method of claim 1, wherein said first and second series of carrier signal samples are stored in memory.

6. The method of claim 2, wherein said first and second series of carrier signal samples describe one cycle of said sinusoid.

7. The method of claim 6, wherein a last sample in said first and second series of carrier signal samples equals 0.

8. The method of claim 1, wherein said first and second series of carrier signal samples are divided into groups of N carrier signal samples.

9. An apparatus for modulating first input signal comprised of first ordered series of samples separated by a substantially constant period T and a second input signal comprised of a second ordered series of samples separated by the substantially constant period T, the apparatus comprising:

a first numerically controlled oscillator comprising a first carrier signal stored in memory as a series of first carrier samples separated by the substantially constant period T, wherein one of said first carrier samples corresponds to each of the first input signal samples;

a second numerically controlled oscillator comprising a second carrier signal stored in memory as a series of second carrier samples separated by the substantially constant period T, wherein one of said second carrier samples corresponds to each of the second input signal samples;

a first demultiplexer for selecting a plurality of N successive first samples from said first series of input signal samples, said first series of samples having an input order;

a first multiplier for multiplying each of said N selected first samples by said corresponding first carrier sample in parallel;

a first multiplexer for recombining said N multiplied first samples while maintaining said input order;

a second demultiplexer for selecting a plurality of N successive second samples from said second series of input signal samples, said second series of samples having an input order;

a second multiplier for multiplying each of said N selected second samples by said corresponding second carrier sample in parallel; and a second multiplexer for recombining said N multiplied second samples while maintaining said input order.

10. The apparatus of claim 9, wherein said first carrier signal and said second carrier signal are sinusoids, said sinusoids having a cycle with a duration of greater than or equal to 2 T and further wherein said sinusoids are 90 degrees out of phase.

11. The apparatus of claim 9, wherein ½ T=2 GHz.

12. The apparatus of claim 9, wherein N=4.

13. The apparatus of claim 10, wherein said series of first carrier signal samples and said series of second carrier signal samples each describe one cycle of their respective sinusoids.

14. The apparatus of claim 9, wherein a last sample in each of said series equals 0.

15. The apparatus of claim 9, wherein said first series of carrier signal samples are divided into groups of N first carrier signal samples and said memory comprises N first independent memory blocks, one of each of said group of N first samples in one of said N first independent memory blocks and wherein said second series of carrier signal samples are divided into groups of N carrier second signal samples and said memory comprises N second independent memory blocks, one of each of said group of N second samples in one of said N second independent memory blocks.

16. A QAM modulation method for modulating a first input signal at a first frequency and a second input signal at a second frequency different from the first frequency, the method comprising:

for the first input signal:
converting the first input signal into a first I input signal and a first Q input signal, each of said first I input signal and said first Q input signal comprising an ordered series of samples separated by a substantially constant period T;
providing a first pair of sinusoidal carrier signals at the first frequency, said first pair of sinusoidal carrier signals mutually 90 degrees out of phase, each of said first pair of carrier signals comprised of an ordered series of carrier samples separated by said substantially constant period T, wherein one of said carrier samples of a first of said first pair of sinusoidal carrier signals corresponds to each of said first I input signal samples and one of said carrier samples of a second of said first pair of sinusoidal carrier signals corresponds to each of said first Q input signal samples;
multiplying each of said first I input signal samples and each of said first Q input signal samples by said corresponding first carrier sample;
adding each of said first multiplied I input signal samples to a respective one of said first multiplied Q input signal samples to form a first series of output samples;

for the second input signal:
converting the second input signal into a second I input signal and a second Q input signal, each of said second I input signal and said second Q input signal comprising an ordered series of samples separated by said substantially constant period T;
providing a second pair of sinusoidal carrier signals at the second frequency, said second pair of sinusoidal carrier signals 90 degrees out of phase, each of said second pair of carrier signals comprised of an ordered series of carrier samples separated by said substantially constant period T, wherein one of said carrier samples of a first of said second pair of sinusoidal carrier signals corresponds to each of said second I input signal samples and one of said carrier samples of a second of said second pair of sinusoidal carrier signals corresponds to each of said second Q input signal samples;
multiplying each of said second I input signal samples and each of said second Q input signal samples by said corresponding second carrier sample;
adding each of said multiplied second I input signal samples to a respective one of said multiplied second Q input signal samples to form a second series of output samples;
combining each of said first series of output samples with each a respective one of said second series of output samples to form a combined series of output samples; and
converting said combined series of output samples to an analog signal using a DAC.

17. The QAM modulation method of claim 16, wherein the first input signal and the second input signal are data streams, wherein converting said first input signal into said first I input signal said first Q signal comprises alternately dividing the first input signal data stream into a first series of groups of K bits and a second series of groups of K bits, generating a first series of pulses having an amplitude relative to a value of each of said first series of groups of K bits, generating a second series of pulses having an amplitude relative to a value of each of said second series of groups of K bits, combining said first series of pulses to form said first I input and combining said second series of pulses to form said first Q signal and further wherein converting said second input signal into said second I input signal said second Q input signal comprises alternately dividing the second input signal data stream into a first series of groups of L bits and a second series of groups of L bits, generating a third series of pulses having an amplitude relative to a value of each of said second series of groups of L bits, generating a fourth series of pulses having an amplitude relative to a value of each of said second series of groups of L bits, combining said third series of pulses to form said first I input and combining said fourth series of pulses to form said first Q signal, wherein each of said pulses comprising a plurality of samples separated by said substantially constant period T.

* * * * *